(12) United States Patent
Burns (10) Patent No.: US 7,379,629 B1
(45) Date of Patent: May 27, 2008

(54) OPTICALLY COUPLED RESONANT PRESSURE SENSOR

(76) Inventor: David W. Burns, 15770 Rica Vista Way, San Jose, CA (US) 95127-2731

( * ) Notice: Subject to any disclaimer, the term of this patent is extended or adjusted under 35 U.S.C. 154(b) by 42 days.

(21) Appl. No.: 11/164,916

(22) Filed: Dec. 10, 2005

Related U.S. Application Data (60) Provisional application No. 60/593,118, filed on Dec. 12, 2004.

(51) Int. Cl.
*G02B 6/00* (2006.01)

(52) U.S. Cl. .............................. 385/12; 385/32; 385/30; 385/8; 385/9

(58) Field of Classification Search .................. 385/12, 385/13, 37
See application file for complete search history.

(56) References Cited

U.S. PATENT DOCUMENTS

| | | |
|---|---|---|
| 4,126,049 A | 11/1978 | Cotter |
| 4,137,511 A | 1/1979 | Jones |
| 4,372,173 A | 2/1983 | EerNise |
| 4,567,451 A | 1/1986 | Greenwood |
| 4,721,925 A | 1/1988 | Farace |
| 4,724,351 A | 2/1988 | EerNisse |
| 4,743,752 A | 5/1988 | Olsen |
| 4,744,863 A | 5/1988 | Guckel |
| 4,772,786 A | 9/1988 | Langdon |
| 4,831,304 A | 5/1989 | Dorey |
| 4,841,775 A | 6/1989 | Ikeda |
| 4,853,669 A | 8/1989 | Guckel |
| 4,884,450 A | 12/1989 | Greenwood |
| 4,897,360 A | 1/1990 | Guckel |
| 4,926,143 A | 5/1990 | Harada |
| 4,966,649 A | 10/1990 | Harada |
| 4,996,082 A | 2/1991 | Guckel |
| 5,009,108 A | 4/1991 | Harada |
| 5,060,526 A | 10/1991 | Barth |
| 5,089,695 A | 2/1992 | Willson |
| 5,090,254 A | 2/1992 | Guckel |
| 5,101,664 A | 4/1992 | Hockaday |
| 5,105,665 A * | 4/1992 | Parsons et al. ................ 73/704 |
| 5,165,289 A | 11/1992 | Tilmans |
| 5,188,983 A | 2/1993 | Guckel |
| 5,275,055 A | 1/1994 | Zook |
| 5,295,395 A | 3/1994 | Hocker |
| 5,338,929 A | 8/1994 | Douma |
| 5,417,115 A | 5/1995 | Burns |
| 5,442,963 A | 8/1995 | Largeau |
| 5,458,000 A | 10/1995 | Burns |
| 5,473,944 A | 12/1995 | Kurtz |
| 5,485,753 A | 1/1996 | Burns |
| 5,511,427 A | 4/1996 | Burns |
| 5,543,349 A | 8/1996 | Kurtz |
| 5,550,516 A | 8/1996 | Burns |

(Continued)

*Primary Examiner*—Eric Wong
(74) *Attorney, Agent, or Firm*—David W. Burns (57) ABSTRACT

An optically coupled resonant pressure sensor includes a deformable diaphragm and an optically coupled resonator fixedly attached to the deformable diaphragm. The resonator includes a resonator body and a laterally offset photodiode adjacent to the resonator body. The resonator is driven by an electric field generated between the laterally offset photodiode and the resonator body when an incident light strikes the photodiode. Pressure applied to one side of the deformable diaphragm causes a shift in a resonant frequency of the resonator. Also disclosed are a method and system for determining pressure.

20 Claims, 10 Drawing Sheets

U.S. PATENT DOCUMENTS

| | | |
|---|---|---|
| 5,559,358 A | 9/1996 | Burns |
| 5,654,819 A | 8/1997 | Goossen |
| 5,683,594 A | 11/1997 | Hocker |
| 5,714,690 A | 2/1998 | Burns |
| 5,729,075 A | 3/1998 | Strain |
| 5,747,705 A | 5/1998 | Herb |
| 5,772,322 A | 6/1998 | Burns |
| 5,780,742 A | 7/1998 | Burns |
| 5,808,210 A | 9/1998 | Herb |
| 5,831,262 A | 11/1998 | Greywall |
| 5,844,236 A | 12/1998 | Wilson |
| 5,880,509 A | 3/1999 | Watanabe |
| 5,969,257 A | 10/1999 | De Bortoli |
| 6,006,607 A | 12/1999 | Bryzek |
| 6,031,944 A * | 2/2000 | Youngner .................... 385/12 |
| 6,229,190 B1 | 5/2001 | Bryzek |
| 6,246,638 B1 | 6/2001 | Zook |
| 6,255,728 B1 | 7/2001 | Nasiri |
| 6,346,742 B1 | 2/2002 | Bryzek |
| 6,351,996 B1 | 3/2002 | Nasiri |
| 6,487,913 B2 | 12/2002 | Debesis |
| 6,557,419 B1 | 5/2003 | Herb |
| 6,710,355 B2 | 3/2004 | Youngner |
| 6,714,007 B2 * | 3/2004 | Youngner ................ 324/244.1 |
| 6,763,723 B1 | 7/2004 | Zook |
| 6,894,787 B2 | 5/2005 | Youngner |
| 6,966,228 B2 | 11/2005 | Binet |
| 2004/0231409 A1 | 11/2004 | Lelong-Feneyrou |
| 2004/0244502 A1 | 12/2004 | Youngner |
| 2005/0252300 A1 * | 11/2005 | Miller ........................ 73/715 |

* cited by examiner

FIG. 10

OPTICALLY COUPLED RESONANT PRESSURE SENSOR

CROSS-REFERENCES TO RELATED APPLICATIONS

This application claims the benefit of, and hereby incorporates by reference in its entirety U.S. Provisional Application No. 60/593,118 filed Dec. 12, 2004, and also incorporates by reference in its entirety co-pending U.S. Utility application Ser. No. 10/905,036 filed Dec. 12, 2004, U.S. Provisional Application No. 60/593,116 filed Dec. 12, 2004, U.S. Provisional Application No. 60/593,117 filed Dec. 12, 2004, and U.S. Provisional Application No. 60/593,119 filed Dec. 12, 2004.

FIELD OF THE INVENTION

This invention relates generally to pressure sensors, and more specifically to optically coupled resonant pressure sensors.

BACKGROUND OF THE INVENTION

Resonant sensors are used in the precision pressure measurement field because of their high stability, high sensitivity and low temperature coefficients. Resonant sensors can be constructed of primarily silicon-based materials using standard processes of the semiconductor industry including thin-film deposition, etching, doping and lithography. While resonant pressure sensors are generally more complex than piezoresistive pressure sensors, their stability and accuracy are less dependent on electronic signal processing circuitry than are comparable piezoresistive sensors and capacitive sensors. Currently available resonant sensors have resonators comprised of a single material such as quartz, single crystal silicon or deposited polysilicon films. Very high precision resonators have been made from well-cut quartz.

The vibrating micromechanical body or resonator of a resonant pressure sensor provides a frequency as output data, the frequency depending upon a stress such as pressure that modifies the natural resonant vibrational frequency of the resonator. A load applied to the sensor structure strains the resonator causing a resonant frequency shift of the resonator. The frequency output of the resonator provides a measure of the magnitude of the mechanical load applied to the sensor structure, and as a result, pressure can be measured as a consequence of the frequency shift. Currently available resonant pressure sensors interface with analog and/or digital electronics to measure pressure.

In a conventional piezoresistive pressure sensor, deformations of a silicon diaphragm with applied pressure cause shifts in a Wheatstone bridge fabricated from single-crystal piezoresistors in the diaphragm resulting in a voltage output indicating the amount of pressure applied to the sensor. The output voltage from the Wheatstone bridge requires an analog-to-digital (A/D) conversion to be used in digital systems. An example of a surface-micromachined absolute pressure sensor has a pressure diaphragm formed from a deposited thin film of polysilicon with an integral vacuum cavity reference directly under the diaphragm and dielectrically isolated polysilicon piezoresistors, as described in "Sealed cavity semiconductor pressure transducers and method of producing the same," U.S. Pat. No. 4,744,863, Guckel et al., issued May 17, 1988.

The widespread use and continuing trend toward digital information and control systems, together with the need for more accurate and higher-pressure instrumentation, have prompted the development of digital pressure transducers capable of precision measurements in pressure ranges up to about 250 MPa. One exemplary high-precision digital pressure sensor operates on the principle of changing the resonant frequency of load-sensitive quartz crystals with pressure-induced stress. Frequency signals from the quartz crystals are counted and linearized through microprocessor-based electronics to provide two-way communication and control in digital formats. The aforementioned quartz crystal pressure transducers have a resolution as good as a few parts per billion and have been used to determine the performance of high precision, primary standard dead-weight testers.

One example of a surface-micromachined resonant sensor has a resonant strain gage formed from a deposited thin film of polysilicon with an integral vacuum cavity surrounding the resonator. Several patents providing background to such resonant sensors include "Dielectrically isolated resonant microsensors," U.S. Pat. No. 5,417,115, Burns, issued May 23, 1995; "Static pressure compensation of resonant integrated microbeam sensors," U.S. Pat. No. 5,458,000, Burns et al., issued Oct. 17, 1995; "Cantilevered microbeam temperature sensor;" U.S. Pat. No. 5,511,427, Burns, issued Apr. 30, 1996; "Method for making a thin film resonant microbeam absolute;" U.S. Pat. No. 5,747,705 Herb et al., issued May 5, 1998; and "Thin film resonant microbeam absolute pressure sensor," U.S. Pat. No. 5,808,210 Herb et al., issued Sep. 15, 1998.

Another example of a resonant pressure sensor, which is fabricated from single-crystal silicon, is disclosed in "Semiconductor pressure sensor and its manufacturing method," Watanabe et al., U.S. Pat. No. 5,880,509 issued Mar. 9, 1999. The sensor comprises a single-crystal silicon substrate, a closed air-gap chamber, a measured diaphragm made by epitaxial growth, and a strain detection element incorporated in the measuring diaphragm.

The operation of a resonant pressure sensor requires a resonator to be excited into vibrational motion and detection of this motion. Forces and moments are applied that bend, twist, elongate or contract the resonator. Various methods for excitation and detection of resonant sensors have been proposed including thermal excitation with piezoresistive detection; electrostatic excitation with capacitive detection; Lorentz force excitation with magnetic flux detection; piezoelectric excitation with piezoelectric detection, and optical excitation with optical detection. In an exemplary method, resonant microbeams are driven and sensed by a single multimode optical fiber using a strain-sensitive oscillator, as described in "Fiber-optic vibration sensor based on frequency modulation of light-excited oscillators," U.S. Pat. No. 6,246,638, Zook et al., issued Jun. 12, 2001. A suggested method for driving and sensing a resonant sensor by using modulated and unmodulated light from multiple light sources is described in "Multi-wavelength optical drive/sense readout for resonant microstructures," U.S. Pat. No. 5,844,236, Wilson, issued Dec. 1, 1998. A photodetector detects the filtered reflected light to determine the resonant frequency of the resonator.

Resonators may be hermetically sealed in an evacuated cavity or enclosure to provide separation from the surrounding environment, eliminating effects such as air damping of the resonator and mass loading on the resonator body.

Micro-electrical-mechanical systems (MEMS) researchers are working on producing precision resonant pressure sensors having increased noise immunity, intrinsic safety, and long line-driving capability. It is desirable that a pressure sensor can operate in the harsh conditions associated with, for example, turbine engines, high-speed combustors, and other aerospace and industrial applications.

Because of limitations in the use of electrically powered/electrical output sensors in high-noise environments, hazardous areas, and some medical applications, it is advantageous to combine the precision of resonator-based sensors with the total optical isolation of fiber-optic technology. One method of optically powering a resonant low-pressure sensor is described in "Optically powered resonant integrated microstructure pressure sensor," Youngner, U.S. Pat. No. 6,710,355, issued Mar. 23, 2004.

In the pressure-sensor industry and other sensor application areas, the need exists for precise and stable sensors having low hysteresis, remote access, electromagnetic interference (EMI) immunity, and increased safety in harsh, volatile, or explosive environments with the elimination of voltage and electronic circuitry at the sensor element. Additional features that are desirable for resonant sensors include a simplified fabrication process, integral vacuum sealing, reduction or elimination of stiction and snap-down or pull-in problems associated with the resonator, accurate positioning of the drive and sense electrodes, alignment of the phase between the drive frequency and resonator movement over a wide frequency range, high signal-to-noise ratio of the detected signal, simplification of the optical interface to the resonator, and the opportunity for relatively easy integration of the sensor with more complex fabrication processes such as complementary metal-oxide-semiconductor (CMOS) and bipolar complementary metal-oxide-semiconductor (BiCMOS) processes.

SUMMARY OF THE INVENTION

One aspect of the invention is an optically coupled resonant pressure sensor including a deformable diaphragm and an optically coupled resonator fixedly attached to the deformable diaphragm. The resonator includes a resonator body and a laterally offset photodiode formed in the deformable diaphragm adjacent to the resonator body. The resonator is driven by an electric field generated between the laterally offset photodiode and the resonator body when an incident light strikes the photodiode. Pressure applied to one side of the deformable diaphragm causes a shift in a resonant frequency of the resonator.

Another aspect of the invention is a method of determining pressure. The method includes modulating an incident light. A laterally offset photodiode is struck with the incident light, and an electric field is generated between the laterally offset photodiode and a first resonator in response to the incident light. The first resonator is fixedly attached to a deformable diaphragm. The resonator is driven with a driving component of the generated electric field that diminishes when the first resonator is displaced. At least one resonant frequency of the first resonator is detected. An applied pressure that is applied to the deformable diaphragm is determined based on the detected resonant frequency of the first resonator.

Another aspect of the invention is a system for determining pressure. The system includes means for modulating an incident light; means for striking a laterally offset photodiode with the incident light; means for generating an electric field between the laterally offset photodiode and a first resonator fixedly attached to a deformable diaphragm in response to the incident light; means for driving the resonator with a driving component of the generated electric field that diminishes when the first resonator is displaced; means for detecting at least one resonant frequency of the first resonator; and means for determining an applied pressure applied to the deformable diaphragm based on the detected resonant frequency of the first resonator.

Other aspects, features and attendant advantages of the present invention will become more apparent and readily appreciated by the detailed description given below in conjunction with the accompanying drawings. The drawings should not be taken to limit the invention to the specific embodiments, but are for explanation and understanding and are not necessarily drawn to scale. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE INVENTION

Figure 1A:
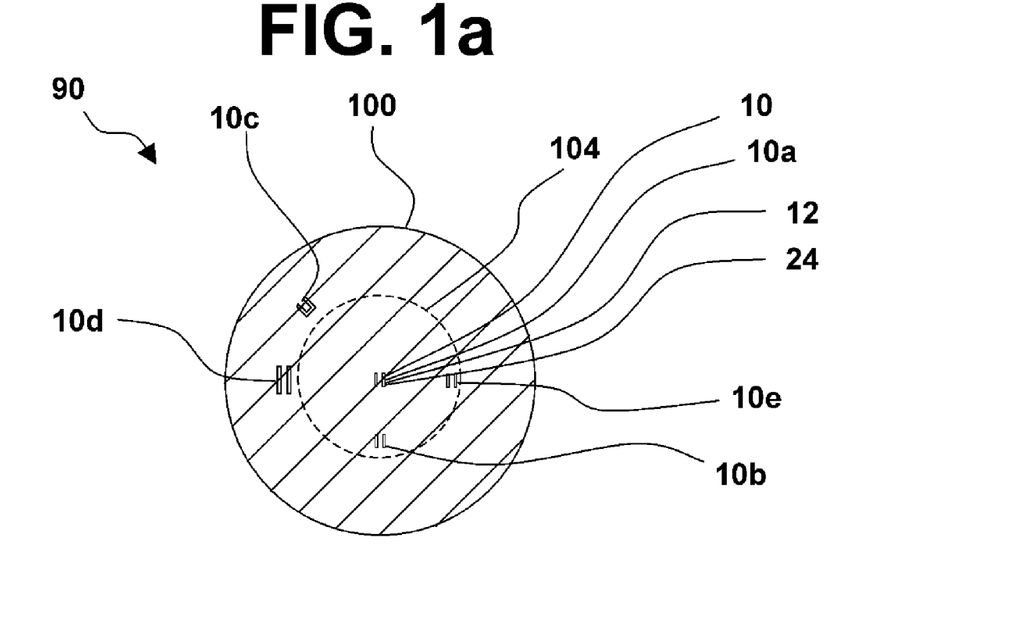
FIG. 1a and FIG. 1b are a top view and a cross-sectional view of an optically coupled resonant pressure sensor, in accordance with one embodiment of the current invention.
Figure 1B:
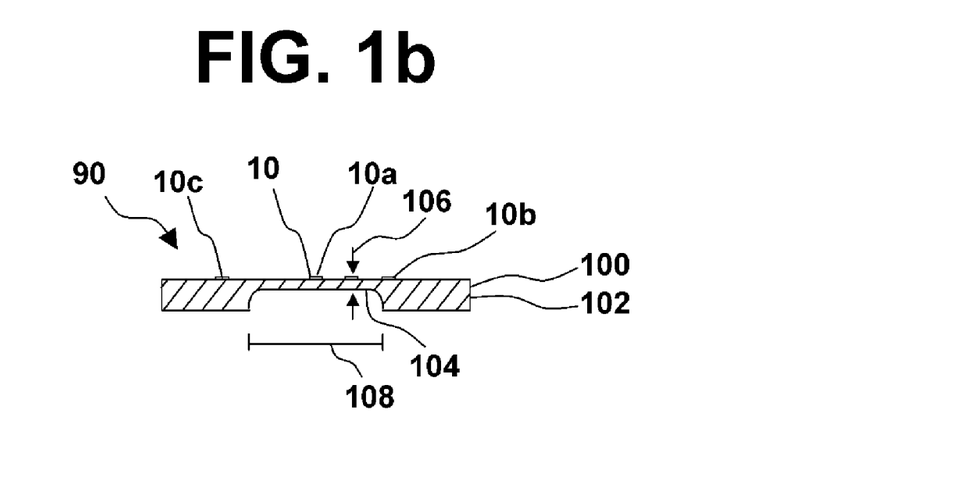

FIG. 1a and FIG. 1b are a top view and a cross-sectional view, respectively, of an optically coupled resonant pressure sensor, in accordance with one embodiment of the present invention. For the description of this figure and the figures that follow, similarly numbered objects correspond to similar elements. Optically coupled resonant pressure sensor 90 includes deformable diaphragm 104 and optically coupled resonator 10 fixedly attached to one side of deformable diaphragm 104. Resonator 10 includes resonator body 12 and laterally offset photodiode 24 formed in deformable diaphragm 104 adjacent to resonator body 12. Photodiode 24 or a laterally offset electrode connected thereto is positioned laterally off of one or more sidewalls of resonator 10 and is in a different plane. Photodiode 24 is, for example, ion implanted into substrate 102 using patterning and doping processes. Other diode formation processes and structures may also suffice, as are known in the art. Resonator 10 is driven by an electric field generated between laterally offset photodiode 24 and resonator body 12 when an incident light strikes photodiode 24. Pressure applied to one side of deformable diaphragm 104 causes a shift in one or more resonant frequencies of resonator 10. The shifts in resonant frequency may be analyzed to determine the applied pressure.

In the embodiment illustrated, optically coupled resonator 10*a* is centered on deformable diaphragm 104 and attached to deformable diaphragm 104 at opposite ends of resonator 10*a*. One or more additional resonators 10*b*, 10*c*, 10*d*, and 10*e* are positioned elsewhere on sensor die 100. Pressure applied to one side of deformable diaphragm 104 causes bending of deformable diaphragm 104 that in turn incurs an axial tension or compression on resonator 10*a*, resulting in a shift in one or more resonant frequencies of resonator 10*a*. For example, pressure applied to pressure sensor 90 causes a shift in the resonant frequency of resonator 10*a*.

Resonator 10*a* is sized, in part, based on an operating range of pressure sensor 90. The thickness, length, width, and geometry of resonator 10*a* are selected based on the desired resonant frequency and frequency range with applied pressure. Dimensions of other resonators 10*b*, 10*c*, 10*d* and 10*e* may be selected such that selected resonant frequencies of resonators 10*b*, 10*c*, 10*d* and 10*e* are non-overlapping over the range of applied pressure and operating temperature range.

Resonator 10*a* and other resonators on or near deformable diaphragm 104 may have one of various geometries such as a rectangular geometry, a circular geometry, a ring geometry, an x-shaped geometry or other geometries including singly and doubly supported designs, layered resonators, tuning forks, balanced configurations, and other geometries. Resonator 10 and other resonators on sensor die 100 may be formed from, for example a material such as amorphous silicon, polycrystalline silicon also known as polysilicon, epi-poly, epitaxial silicon, single-crystal silicon, or a combination thereof that is deposited or otherwise formed on semiconductor substrate 102 or on a sacrificial layer formed thereon. For example, patterning and etching techniques in combination with the use of selectively removed sacrificial layers may be used to form resonator 10 and to seal resonator 10 with an optional resonator shell. Resonator body may be fixedly attached to semiconductor substrate 102 at one attachment location, such as at a supported end of a cantilevered beam or at the center of a ring or disk resonator. Alternatively, resonator 10 may be fixedly attached to semiconductor substrate 102 at opposite ends of resonator 10 as in a clamped-clamped beam such that mechanical strain applied to the opposite ends causes a shift in one or more resonant frequencies of resonator 10.

Deformable diaphragm 104 of sensor die 100 may be formed from a portion of semiconductor substrate 102, such as an n-type or p-type single-crystal silicon wafer, a silicon-on-insulator wafer, a double-SOI wafer, or other suitable substrate. Substrate 102, although presently preferred to comprise silicon, may comprise other materials such as silicon carbide, diamond, silicon-on-sapphire, quartz, Pyrex, glass, metal, ceramic, plastic, an insulative material, a semiconductor material, a conductive material, or a combination thereof.

Diaphragm thickness 106 and diaphragm size 108 of deformable diaphragm 104 are selected based on an operating range of pressure sensor 90. For example, the diameter and thickness of deformable diaphragm 104 is selected to generate a maximum amount of bending strain at the center of deformable diaphragm 104, while maintaining maximum bending stresses within fracture stress limitations of the diaphragm material over the operating range of pressure sensor 90. The bending strain is, in turn, applied to resonator 10*a* resulting in shifts of one or more resonant frequencies.

To increase the range of the output signal, another resonator may be used that decreases in frequency with applied pressure while the first increases in frequency. Second resonator 10*b* is fixedly attached to deformable diaphragm 104 at two attachment locations near a periphery of deformable diaphragm 104. Pressure applied to one side of deformable diaphragm 104 causes a shift in one or more resonant frequencies of second resonator 10*b* in a direction opposite that of first resonator 10*a*.

To compensate for temperature variations so that more accurate pressure measurements may be obtained, a temperature sensor of some form such as a cantilevered resonator is coupled to sensor die 100. Third resonator 10*c* is fixedly attached at one attachment location to sensor die 100. A shift in a temperature of sensor die 100 causes a shift in one or more resonant frequencies of third resonator 10*c*. Third resonator 10*c* is attached to sensor die 100 on or off of a surface of deformable diaphragm 104.

For applications where small pressure differentials across deformable diaphragm 104 are to be measured amidst a large static pressure applied to each side of deformable diaphragm 104, a static pressure sensor such as another doubly attached resonator can be coupled to sensor die 100. Fourth resonator 10*d* is fixedly attached to sensor die 100 at two attachment locations beyond the periphery of deformable diaphragm 104. A shift in static pressure applied to pressure sensor 90 causes a shift in one or more resonant frequencies of fourth resonator 10*d*.

Resonator 10*e* may be fixedly attached at two locations near a periphery of deformable diaphragm 104 in a direction parallel to the periphery to provide a shift in one or more resonant frequencies with applied pressure.

Resonator shells may be included around resonator body 12 and laterally offset photodiode 24 of each resonator 10*a*, 10*b*, 10*c*, 10*d* and 10*e*. Resonator shells allow resonator bodies 12 to vibrate within a resonator cavity between the resonator shell and resonator body 12 with minimal viscous damping when a vacuum is sealed within the resonator cavity.

Resonators 10*a*, 10*b*, 10*c*, 10*d* and 10*e* may be optically coupled via an optical fiber to externally connected driving and sensing systems that contain suitable optical and electronic components to determine resonant frequencies and resonant frequency shifts, and to deduce the applied pressure. In one example, a single optical fiber is optically coupled to resonator 10*a*. Other resonators 10*b*, 10*c*, 10*d* and 10*e* are mechanically coupled via deformable diaphragm 104 to resonator 10*a* such that scanning incident light onto resonator 10*a* results in detectable indications on resonator 10*a* of resonance frequencies of resonators 10*b*, 10*c*, 10*d* and 10*e*, allowing variations in the position of various resonators on deformable diaphragm 104 and associated pressure ranges thereof. In a second example, an optical fiber has a sufficiently large diameter for optically coupling to resonators 10*a*, 10*b*, 10*c*, 10*d* and 10*e* of sensor die 100.

Figure 2:
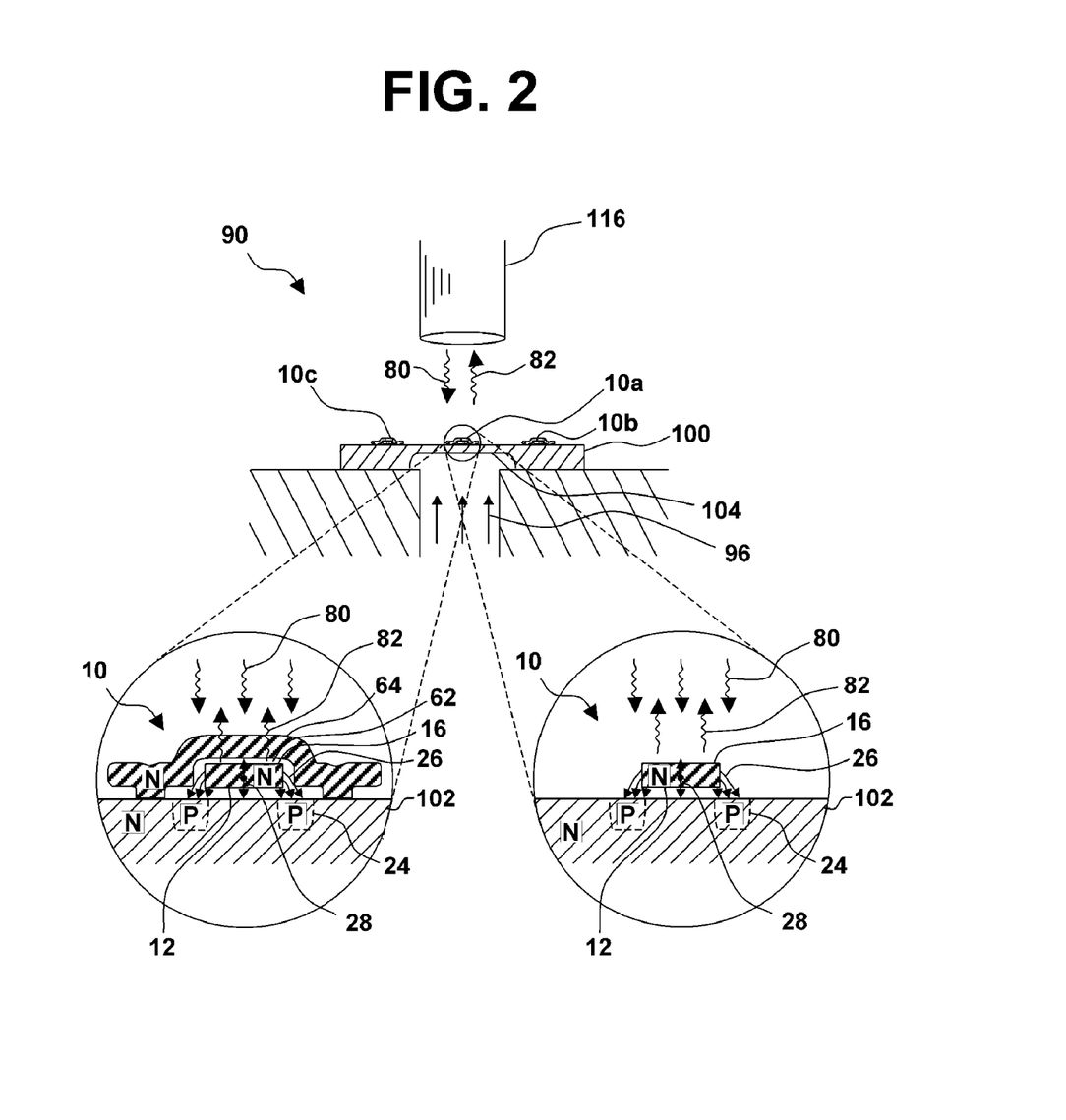
FIG. 2 illustrates an optically coupled resonant pressure sensor, in accordance with one embodiment of the current invention.

FIG. 2 illustrates an optically coupled resonant pressure sensor, in accordance with one embodiment of the present invention. Optically coupled resonant pressure sensor 90 includes deformable diaphragm 104 and optically coupled resonator 10 fixedly attached to deformable diaphragm 104. Resonator 10 with resonator body 12 has laterally offset photodiode 24 formed in semiconductor substrate 102 adjacent to resonator body 12. Resonator 10 is driven by electric field 26 generated between laterally offset photodiode 24 and resonator body 12 when incident light 80 strikes photodiode 24. Pressure 96 applied to one side of deformable diaphragm 104 causes a shift in one or more resonant frequencies of resonator 10. Resonator shell 64 may be included around resonator body 12 and laterally offset photodiode 24 that allows resonator body 12 to allow resonator 10 to vibrate freely with minimal viscous damping forces within resonator cavity 62 between resonator shell 64 and resonator body 12. Resonator shell 64 may be sealed and may contain a vacuum.

Resonator body 12 and resonator shell 64 may be formed from, for example a material such as amorphous silicon, polycrystalline silicon, epi-poly, epitaxial silicon, single-crystal silicon, silicon-germanium, silicon carbide, diamond, or a combination thereof that is deposited or otherwise formed on semiconductor substrate 102 or on a sacrificial layer formed thereon.

One aspect of laterally offset photodiode 24 is that driving component 28 of generated electric field 26 can diminish when resonator body 12 is displaced towards semiconductor substrate 102. A desirable attribute is that generated electric field 26 between laterally offset photodiode 24 and resonator body 12 diminishes when resonator body 12 is displaced, so as to prevent electrostatic pull-in, an unstable position whereby a portion of resonator body 12 is electrostatically attracted to and may become stuck against semiconductor substrate 102. Electrostatic pull-in, also referred to as snap-down or snap-in, may be avoided with sufficient lateral space between sidewall 14 of resonator 10 and laterally offset photodiode 24. With laterally offset photodiode 24 or a laterally offset electrode attached thereto, larger gaps between resonator body 12 and semiconductor substrate 102 are attainable, thereby further reducing the possibility of stiction during fabrication. Another desirable attribute is that laterally offset photodiode 24 can generate driving component 28 of electric field 26 substantially in phase with a vibrating velocity of resonator body 12 with appropriate modulation of incident light 80, allowing operation over a wide range of frequencies without undue correction for phase shifts.

Photodiode 24, illustrated here as formed in semiconductor substrate 102, may alternatively be positioned underneath, to the side, or above resonator body 12. In another embodiment, photodiode 24 is positioned farther away from resonator body 12 and electrically connected to a laterally offset electrode that is adjacent to resonator body 12. In another embodiment, a plurality of photodiodes 24 is positioned adjacent to selected portions of resonator body 12 to allow preferential excitation of higher order resonant modes. In another embodiment, photovoltage or photocurrent generated by photodiode 24 with vibrations of resonator body 12 provide input signals for on-board or off-chip electronic circuitry.

Resonator 10a, centered on deformable diaphragm 104 and attached to deformable diaphragm 104 at two attachment locations, is sized based on what operating range of pressure sensor 90 is targeted. Applied pressure 96 applied to deformable diaphragm 104 causes shifts in one or more resonant frequencies of resonator 10a. Optionally, second resonator 10b is fixedly attached to deformable diaphragm 104 at two attachment locations, such that applied pressure 96 applied to one side of deformable diaphragm 104 causes a shift in one or more resonant frequencies of second resonator 10b in a direction opposite that of resonator 10a. Optionally, third resonator 10c is fixedly attached at one attachment location to sensor die 100 on or off of deformable diaphragm 104. A shift in a temperature of sensor die 100 causes a shift in one or more resonant frequencies of third resonator 10c. An optional fourth resonator (not shown) may be fixedly attached to sensor die 100, such that a shift in static pressure applied to pressure sensor 90 causes a shift in a resonant frequency of the fourth resonator.

To drive and sense one or more resonant frequencies of resonator 10a and other resonators 10b and 10c, incident light 80 directed via optical fiber 116 and optional lensing elements (not shown) onto laterally offset photodiode 24 drives resonator 10a and may also drive resonators 10b and 10c that are either optically coupled via incident light 80 directly from optical fiber 116 or mechanically coupled to resonator 10a. Optical fiber 116 comprises, for example, a single-mode or multimode optical fiber. To sense one or more resonant frequencies of resonator 10a and other resonators 10b and 10c, reflected light 82 from resonator surface 16 of resonator 10a is detected via optical fiber 116. Resonator shell 64 is at least partially transmissive to incident light 80 and reflected light 82 to allow optical drive and sense.

One implementation of a system for determining pressure includes a controllable light source, such as a light emitting diode (LED) or a solid-state laser that provides modulated incident light 80, and appropriate optical elements that guide incident light 80 to photodiode 24 so that electric field 26 and driving component 28 can be generated for driving resonator 10, which is attached to deformable diaphragm 104. Reflected light 82 that is returned from a modulated or unmodulated light source is detected, for example, with a photodiode or other suitable photodetector to provide an electrical signal corresponding to motion of resonator body 12 and to allow applied pressure 96 to be determined with a signal processing algorithm. One or more pressure ports allow pressure to be applied to one side of deformable diaphragm 104 or the other so that differences in applied pressure can be detected. In another embodiment, a reference pressure such as a vacuum is maintained on one side of deformable diaphragm 104, while the pressure to be measured is applied to the other side of deformable diaphragm 104.

An additional resonator, which is optically driven and sensed and has a design such as in a push-pull configuration, may be positioned on or near deformable diaphragm 104 to allow accurate determination of applied pressure 96. Another resonator such as a cantilevered resonator may be included on or near deformable diaphragm 104 to provide an indication of temperature and to compensate for temperature effects. Another resonator may be included near deformable diaphragm 104 to provide an indication of static pressure and to allow compensation of differential pressures applied across deformable diaphragm 104 with static pressure.

Although incident light 80 and reflected light 82 are shown as perpendicular to semiconductor substrate 102, it will be appreciated that other design variations exist, such as the use of angled incident and angled reflected light, or the use of light impinging from below through a suitably transmissive substrate. Incident light 80 may be comprised of a single wavelength of light or of multiple wavelengths of light, and may cover a narrow or broad range of wavelengths. In one example, incident light 80 of a single wavelength is partially reflected from a surface of resonator body 12. In another example, incident light 80 comprises two wavelengths from two light sources, one of which is used to generate the photovoltage while the other is used to determine vibrations or displacements of resonator body 12. In an alternative configuration, vibrations or displacements of resonator body 12 are detected with a second laterally offset photodiode, and the resulting electrical signal is processed by on-chip or off-chip electronics. In another alternative configuration, laterally offset photodiode 24 is configured in a self-resonant mode wherein lateral displacements of resonator body 12 diminish the intensity of incident light 80 striking the photodiode, which in turn reduce driving force 28 and allow resonator 10 to return towards an equilibrium position. The driving cycle is then repeated.

Figure 3:
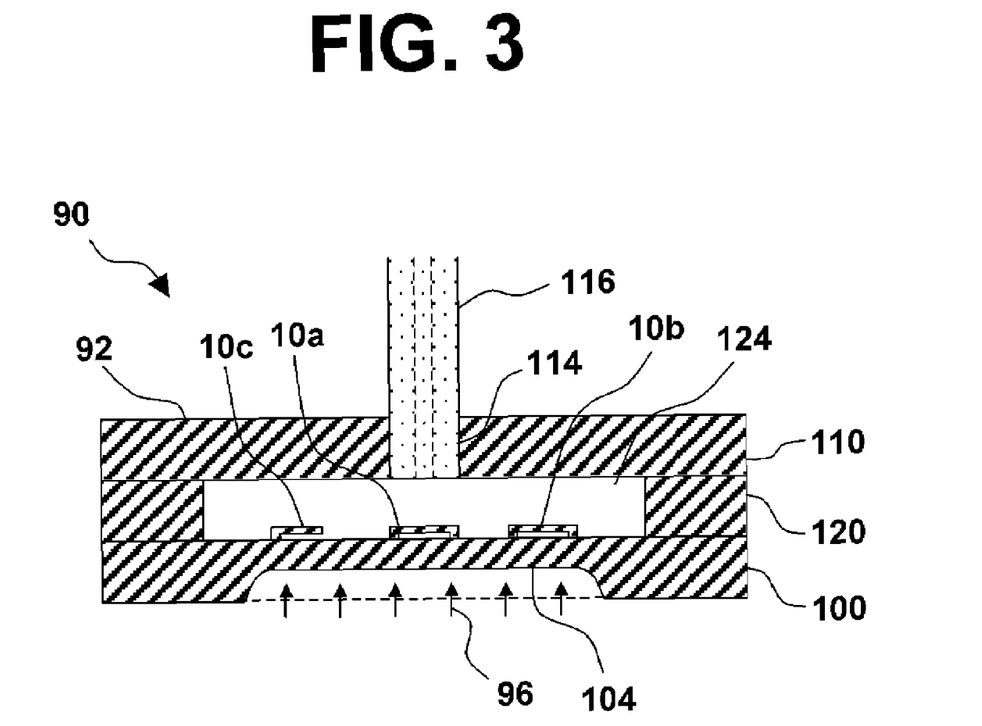
FIG. 3 illustrates an optically coupled resonant pressure sensor, in accordance with another embodiment of the current invention.

FIG. 3 illustrates an optically coupled resonant pressure sensor, in accordance with another embodiment of the present invention. Optically coupled resonant pressure sensor 90 includes deformable diaphragm 104 and optically coupled resonator 10a fixedly attached to and centered on deformable diaphragm 104 of sensor die 100. Cap die 110 including fiber hole 114 and an optional cap recess is positioned over resonator 10 to allow excitation and detection of resonator vibrations via optical fiber 116 that is inserted through fiber hole 114. Optional spacer die 120 including spacer hole 124 may be positioned between cap die 110 and sensor die 100. Second resonator 10b, fixedly attached to deformable diaphragm 104 at two attachment locations, causes a shift in one or more resonant frequencies of resonator 10b in a direction opposite that of optically coupled resonator 10a when applied pressure 96 is applied to one side of deformable diaphragm 104. Third resonator 10c may be fixedly attached at one attachment location to sensor die 100 such that a shift in a temperature of sensor die 100 causes a shift in one or more resonant frequencies of resonator 10c. A fourth resonator (not shown) may be fixedly attached to sensor die 100 such that shifts in static pressure applied to pressure sensor 90 causes a shift in a resonant frequency of the fourth resonator.

Vacuum-sealed resonator shells 64, described with respect to FIG. 2, may be included around resonators 10a, 10b and 10c to allow resonators 10a, 10b and 10c to vibrate within resonator shell 64 with minimal viscous damping. An additional pressure port (not shown) formed through a portion of sensor capsule 92 may be included to allow the configuration of gage pressure sensors and differential pressure sensors.

Sensor capsule 92 including cap die 110 having fiber hole 114 and sensor die 100 may be suspended by optical fiber 116 in a pressure sensor housing (not shown).

Figure 4:
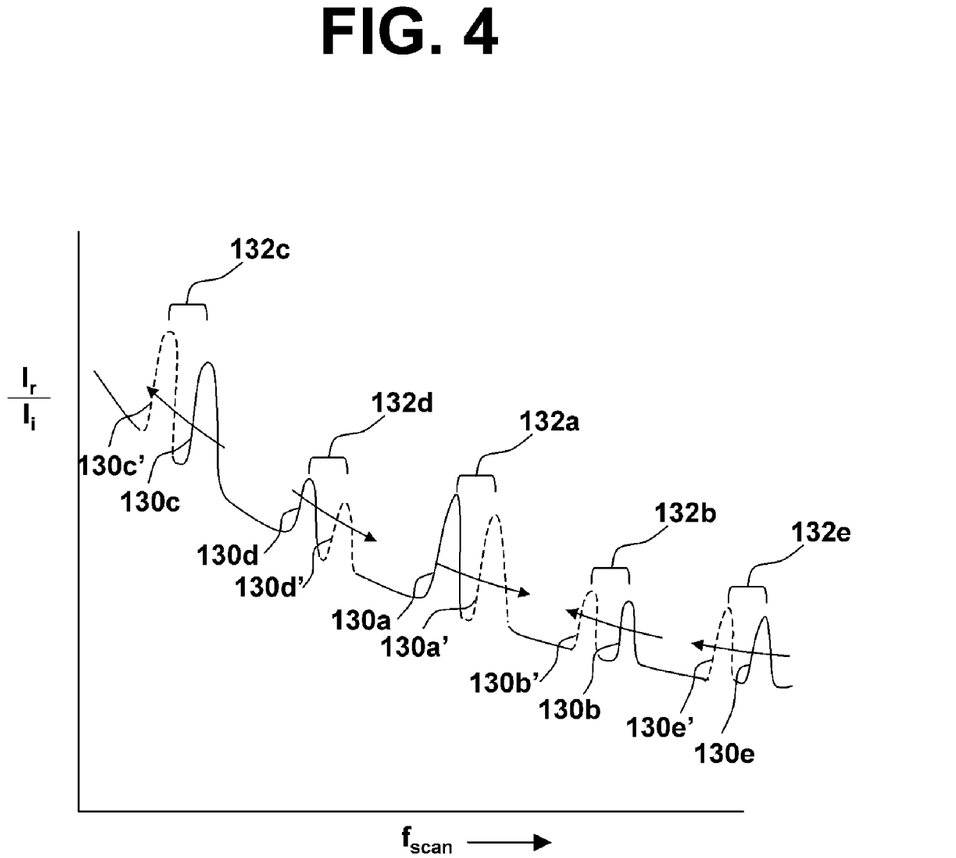
FIG. 4 is a graph illustrating a method of determining pressure, in accordance with one embodiment of the current invention.

FIG. 4 is a graph illustrating a method of determining pressure, in accordance with one embodiment of the present invention. As incident light is modulated through a predetermined frequency scan range, resonators 10a, 10b, 10c, 10d and 10e, as described with respect to FIG. 1, are excited in turn, resulting in resonant peaks at resonant frequencies 130a, 130b, 130c, 130d and 130e, respectively. As pressure is applied, shifts occur in resonators 10a, 10b, 10d and 10e, resulting in shifted resonant frequencies 130a', 130b', 130d' and 130e' with resonant frequency shifts 132a, 132b, 132d and 132e, respectively. Observe that resonant frequency shift 132b occurs in a direction opposite that of resonant frequency shift 132a. When temperature is increased or decreased, resonant frequency 130c becomes shifted resonant frequency 130c' with concomitant resonant frequency shift 132c. The order and direction of frequency shifts 132a, 132b, 132c, 132d and 132e with change in applied pressure and operating temperature may be altered from that shown without loss of generality.

Applied pressure with compensation for temperature is determined from one or more resonant frequencies and their corresponding shifts. Optionally, temperature may be determined based on the resonant frequency and frequency shift of one or more resonators. Calculations of resonant frequency and frequency shifts of one or more resonators may provide output variables for environmental variables such as temperature and static pressure, as well as applied pressure.

Figure 5:
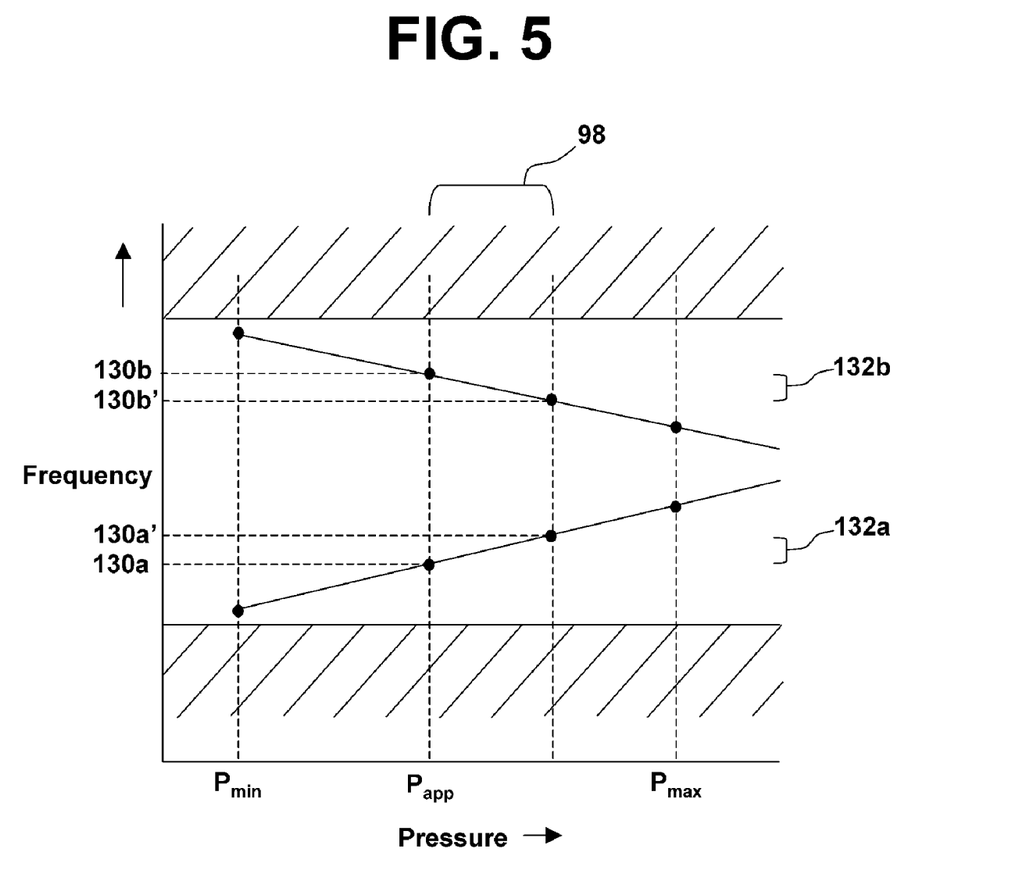
FIG. 5 is a graph illustrating another method of determining pressure, in accordance with one embodiment of the current invention.

FIG. 5 is a graph illustrating another method of determining pressure, in accordance with one embodiment of the present invention. In an exemplary push-pull configuration, a first resonator increases in frequency with applied pressure while a second resonator decreases in frequency with applied pressure. For example, with pressure Papp applied within the nominal operating range, the first resonator resonates at resonant frequency 130a and the second resonator resonates at resonant frequency 130b. As pressure is increased in an amount corresponding to applied pressure shift 98, the resonant frequency of the first resonator increases to resonant frequency 130a' with resonant frequency shift 132a, and the resonant frequency of the second resonator decreases to resonant frequency 130b' with resonant frequency shift 132b. The level and the shift in applied pressure are determined based on the resonant frequencies and the associated shifts in resonant frequency.

Figure 6:
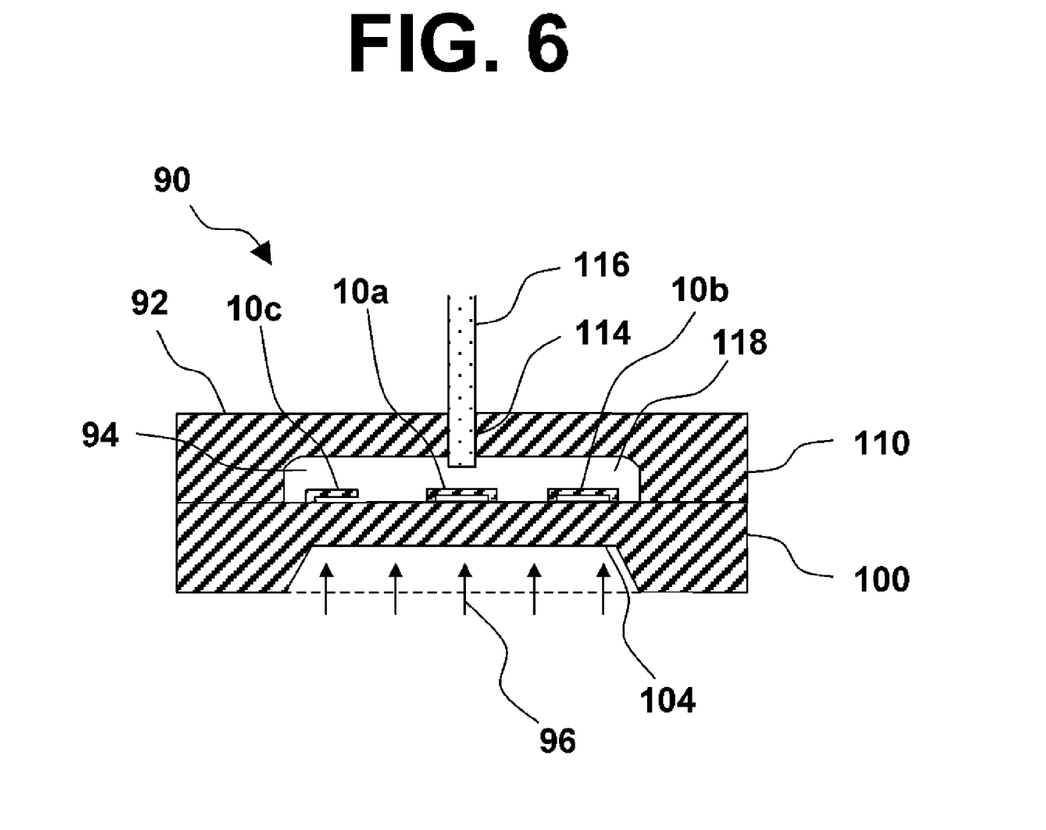
FIG. 6 is a cross-sectional view of an optically coupled resonant pressure sensor, in accordance with another embodiment of the current invention.

FIG. 6 is a cross-sectional view of an optically coupled resonant pressure sensor, in accordance with another embodiment of the present invention. Optically coupled resonant pressure sensor 90 includes deformable diaphragm 104 and optically coupled resonator 10a fixedly attached to deformable diaphragm 104 of sensor die 100. Pressure 96 applied to one side of deformable diaphragm 104 causes a shift in one or more resonant frequencies of resonator 10a.

Cap die 110 with cap recess 118 over deformable diaphragm 104 includes fiber hole 114 positioned over resonator 10. Optical fiber 116 inserted through fiber hole 114 allows excitation and detection of resonator vibrations of resonator 10a and other resonators on sensor die 100 via optical fiber 116. Sensor capsule 92 including cap die 110 and sensor die 100 may be suspended by optical fiber 116 in a suitable package or placed directly into a pressure sensing media.

Pressure reference cavity 94 is created when sensor die 100, cap die 110, and an optional spacer die are aligned and bonded. Interfaces between sensor die 100, cap die 110, optional spacer die, and optical fiber 116 may be sealed to retain a vacuum or a prescribed pressure within pressure reference cavity 94 that allows absolute pressure measurements with resonant pressure sensor 90. Optically coupled resonators 10a, 10b and 10c may have a resonator shell over resonators 10a, 10b and 10c with a vacuum sealed into a resonator cavity between the resonator shell and sensor die 100 to allow non-vacuum environments in pressure reference cavity 94 while allowing resonators 10a, 10b and 10c to operate in a local vacuum environment. With a vacuum sealed into pressure reference cavity 94, the resonator shell around resonators 10a, 10b and 10c may not be needed.

Pressure sensors 90 operable in a differential pressure configuration or a gage pressure configuration may be obtained, for example, with the inclusion of an additional pressure port (not shown) through a portion of resonant pressure sensor capsule 92 into pressure reference cavity 94, thereby allowing pressure from different sources to be applied across deformable diaphragm 104, which result in output signals that correspond to the pressure differential across deformable diaphragm 104.

Second resonator 10b, which is fixedly attached to deformable diaphragm 104 at two attachment locations, shifts one or more resonant frequencies in a direction opposite that of optically coupled resonator 10a when applied pressure 96 is applied to one side of deformable diaphragm 104. Third resonator 10c, fixedly attached at one attachment location to sensor die 100, shifts one or more resonant frequencies when temperature of pressure sensor 90 is changed. A fourth resonator (not shown) may be fixedly attached to sensor die 100 such that a shift in static pressure that is applied to pressure sensor 90 causes a shift in a resonant frequency of the fourth resonator.

Cap die 110 may be appreciably longer in length than shown to provide more stress isolation from optical fiber 116. The cap die may include a side hole for low-profile insertion of an optical fiber. Sensor die 100 may have a contoured diaphragm with controlled thickness contours to accentuate stress at the resonators and a controlled radius at the diaphragm periphery to minimize stress amplification that normally occurs with sharp interior corners.

Figure 7:
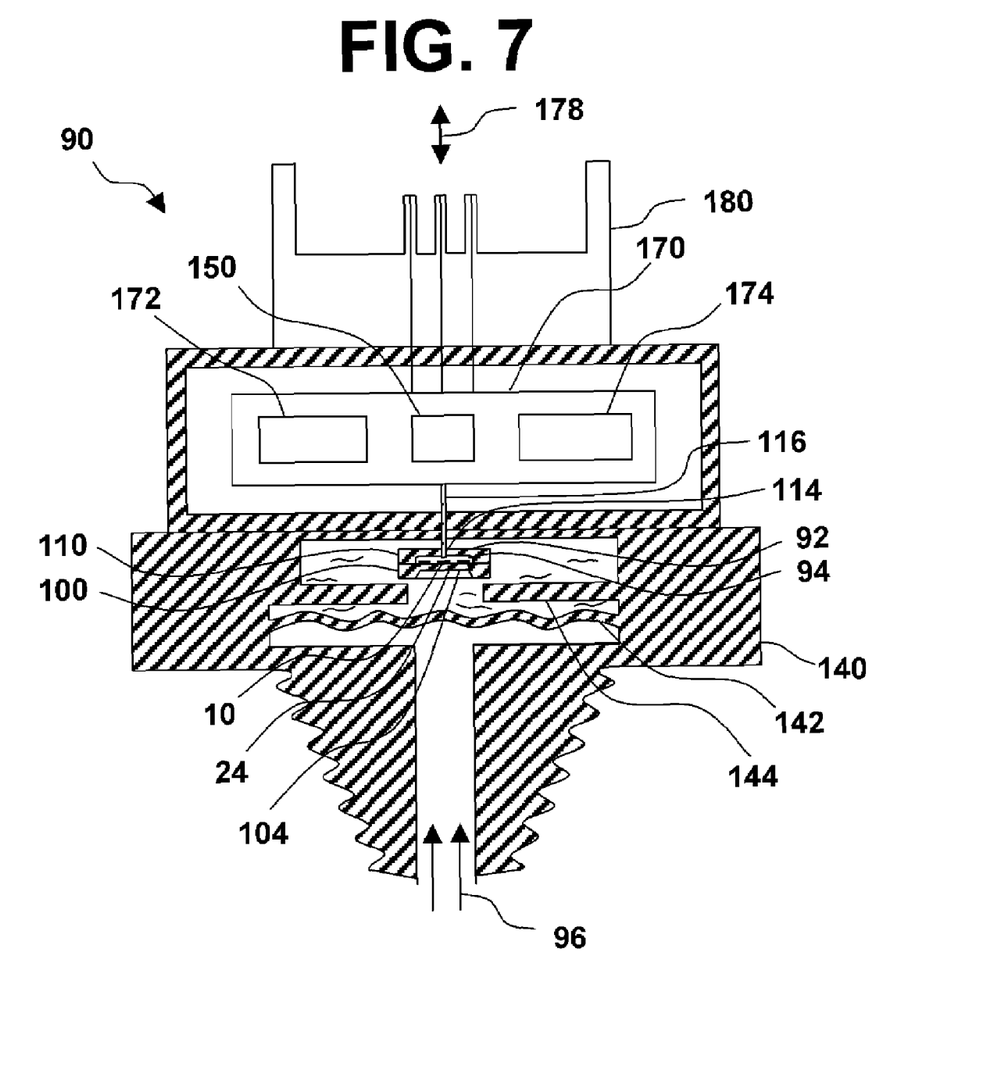
FIG. 7 is a cross-sectional view of a system for determining pressure, in accordance with one embodiment of the current invention.

FIG. 7 is a cross-sectional view of a system for determining pressure, in accordance with one embodiment of the present invention. Optically coupled resonant pressure sensor 90 includes sensor capsule 92 with cap die 110 and sensor die 100 having deformable diaphragm 104 that is suspended by optical fiber 116. Optically coupled resonator 10 is fixedly attached to deformable diaphragm 104. Resonator 10 and laterally offset photodiode 24 formed in deformable diaphragm 104 adjacent to resonator 10 may be excited into resonance and detected with incident light and reflected light via optical fiber 116. Pressure 96 applied to one side of deformable diaphragm 104 causes a shift in one or more resonant frequencies of resonator 10. Other resonators may be included on sensor die 100 to increase accuracy, range and functionality of pressure sensor 90.

Cap die 110 including fiber hole 114 is positioned over resonator 10 to allow detection of resonator vibrations via optical fiber 116, which is inserted through fiber hole 114. An optional spacer die is positioned between cap die 110 and sensor die 100. Pressure reference cavity 94 results with aligned and bonded sensor die 100, cap die 110, and an optional spacer die that may be sealed with a vacuum or other reference pressure. An additional pressure port (not shown) may be fluidly coupled to cavity 94 to allow differential and gage pressure measurements.

Resonator shells may be included around resonator 10 and other resonators on sensor die 100. Vacuum-sealed cavities within the resonator shells allow vibrations of resonator 10 to occur with minimal viscous damping.

Pressure sensor capsule 92 with deformable diaphragm 104 and optically coupled resonator 10 are positioned in pressure sensor housing 140. Barrier membrane 142 is included in pressure sensor housing 140 to isolate pressure sensor capsule 92 from various media. Pressure sensor housing 140 may be fluid filled. For example, fluid-filled pressure sensor housing 140 may include silicone oil between barrier membrane 142 and pressure sensor capsule 92. Mechanical overpressure stop 144 may be included to protect barrier membrane 142 from rupture or breakage in cases of high overpressure.

Electro-opto-electronic module 150 generates incident light and detects reflected light from optically coupled resonator 10 via optical fiber 116. Optical elements such as a lens (not shown) may be included to aid in directing light between optical fiber 116 and resonator 10. One or more light sources such as light-emitting diodes, laser diodes, or other suitable light sources provide light to drive and sense vibrations of resonator 10. Source optics such as filters, lenses, couplers, combiners or optical modulators may be included between light sources and resonator 10. Incident light is modulated, for example, by varying the supply voltage to light source or by controlling the amount of light passing through an optical modulator of source optics. Reflected light is detected with one or more light detectors such as a photodiode, a photodetector, or an optical detector array. Detector optics such as filters, lenses, couplers or splitters may be positioned between resonator 10 and the light detectors.

Electronic module 170 includes controller 172 and memory 174. Controller 172 executes code and provides light control signals to modulate the light sources. Electronic signals from the light detector may be provided to controller 172 to determine of one or more resonant frequencies of resonator 10 on sensor die 100 and to allow analysis thereof, such as determining a value of applied pressure 96. Incident light may be modulated to determine one or more resonant frequencies of additional optically coupled resonators 10 on sensor die 100 or of additional resonators 10 that are mechanically coupled via deformable diaphragm 104 to resonator 10 for enhanced output. Output data such as raw light signal levels or fully analyzed and formatted output data 178 are communicated externally through electronic port 180 and associated electrical connector such as a serial port, a USB port, a parallel port, a wireless port, or other suitable unidirectional or bi-directional communication port. In another configuration, batteries and wireless communication chips inside the package allow wireless networking of the sensor.

Figure 8:
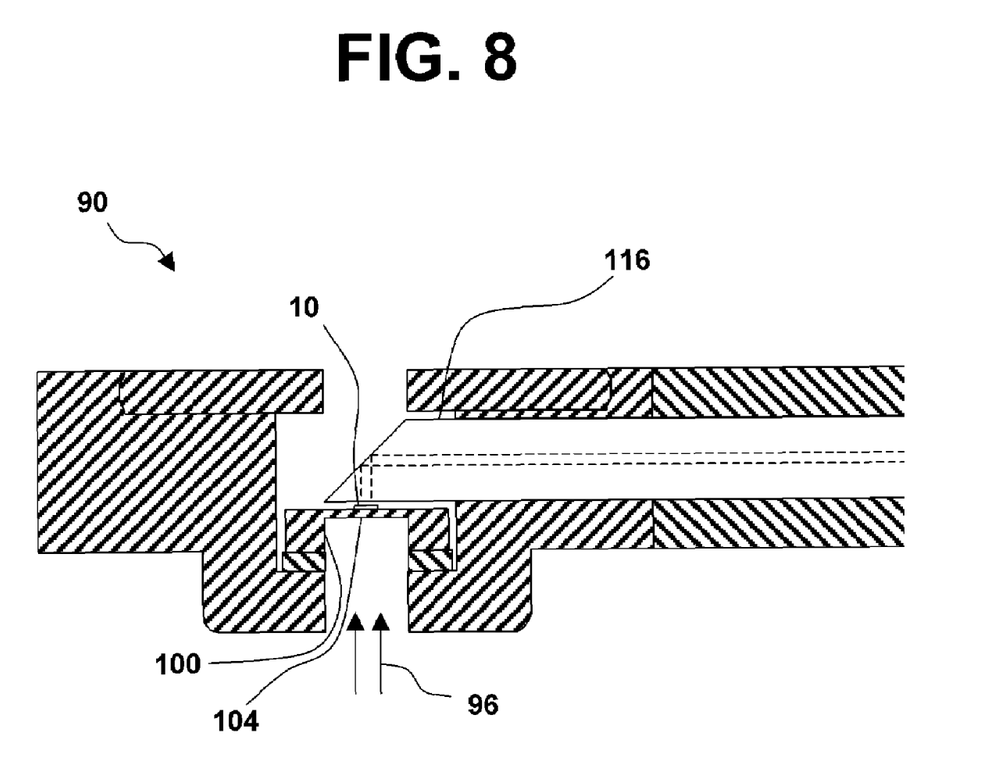
FIG. 8 is a cross-sectional view of a system for determining pressure, in accordance with another embodiment of the current invention.

FIG. 8 is a cross-sectional view of a system for determining pressure, in accordance with another embodiment of the present invention. Pressure sensor 90 has sensor die 100 with optically coupled resonator 10 on pressure-sensitive deformable diaphragm 104, attached with a suitable bonding material to a plastic package having a lid. Optical fiber 116 is inserted from the side of the package, and has a beveled end to redirect light onto resonator 10 and detect reflected light therefrom. The cylindrical fiber can aid in focusing incident and reflected light onto resonator 10. Pressure 96 is applied to one side of diaphragm 104. The opposite side of diaphragm 104 may be exposed directly to the atmosphere for gage pressure measurements, to another pressure port for differential pressure measurements, or sealed in a vacuum or reference pressure to provide absolute pressure measurements. The package may be adapted, for example, to accommodate an optical connector such as an SMA connector for optical connection to external interface and data processing electronics.

Figure 9:
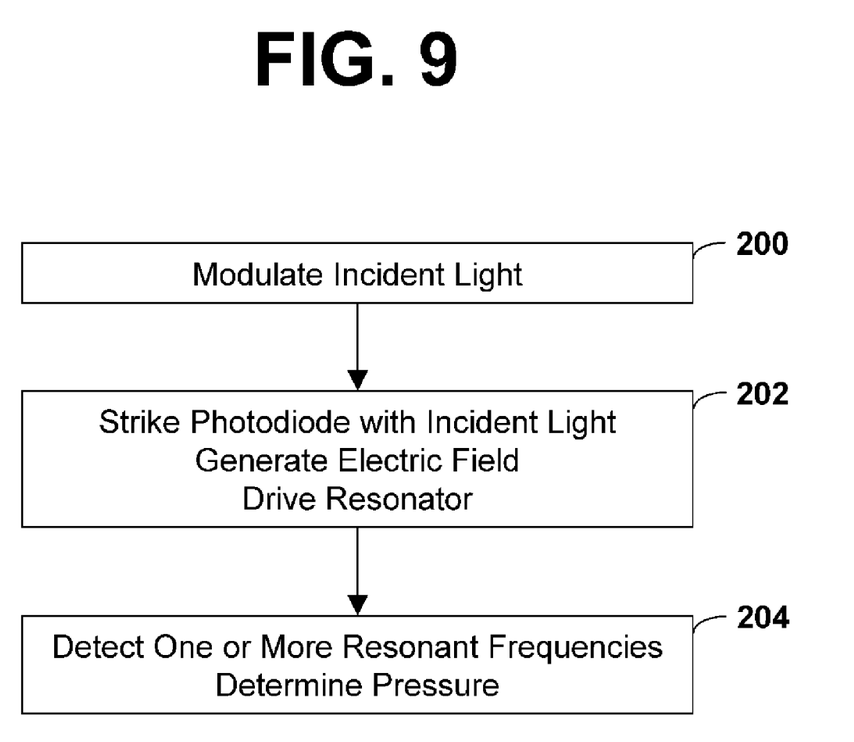
FIG. 9 is a flow diagram of a method for determining pressure, in accordance with one embodiment of the current invention.

FIG. 9 is a flow diagram of a method for determining pressure, in accordance with one embodiment of the present invention.

To drive an optically coupled resonator of an optically coupled pressure sensor, an incident light is modulated, as seen at block 200. Incident light from a light source such as a light-emitting diode (LED), a laser diode, a laser, or a light bulb is modulated by controlling the amount of light emitted or by modulating the emitted light with a light modulator positioned in the path of the incident light. The modulated incident light is guided to the resonator, which is fixedly attached to a deformable diaphragm.

A laterally offset photodiode is struck with the modulated incident light, as seen at block 202. When the laterally offset photodiode is struck with the incident light, an electric field is generated and the resonator is driven. The electric field is generated between the laterally offset photodiode and the resonator in response to the incident light. The resonator is driven with a driving component of the generated electric field. With suitable positioning of the laterally offset photodiode with respect to the resonator, the driving component of the generated electric field diminishes as the resonator is displaced.

One or more resonant frequencies are detected, as seen at block 204. Resonant frequencies of one or more resonators on the deformable diaphragm are detected, for example, with reflected light reflected from one or more surfaces of the resonator. As pressure is applied to the deformable diaphragm, one or more resonant frequencies shift with the applied pressure. Detection of the shifted resonant frequencies allows the pressure to be determined. Resonant frequencies of other resonators can be similarly detected to increase the accuracy and resolution of the pressure measurements and to provide multivariable output such as differential pressure, temperature, and static pressure.

Figure 10:
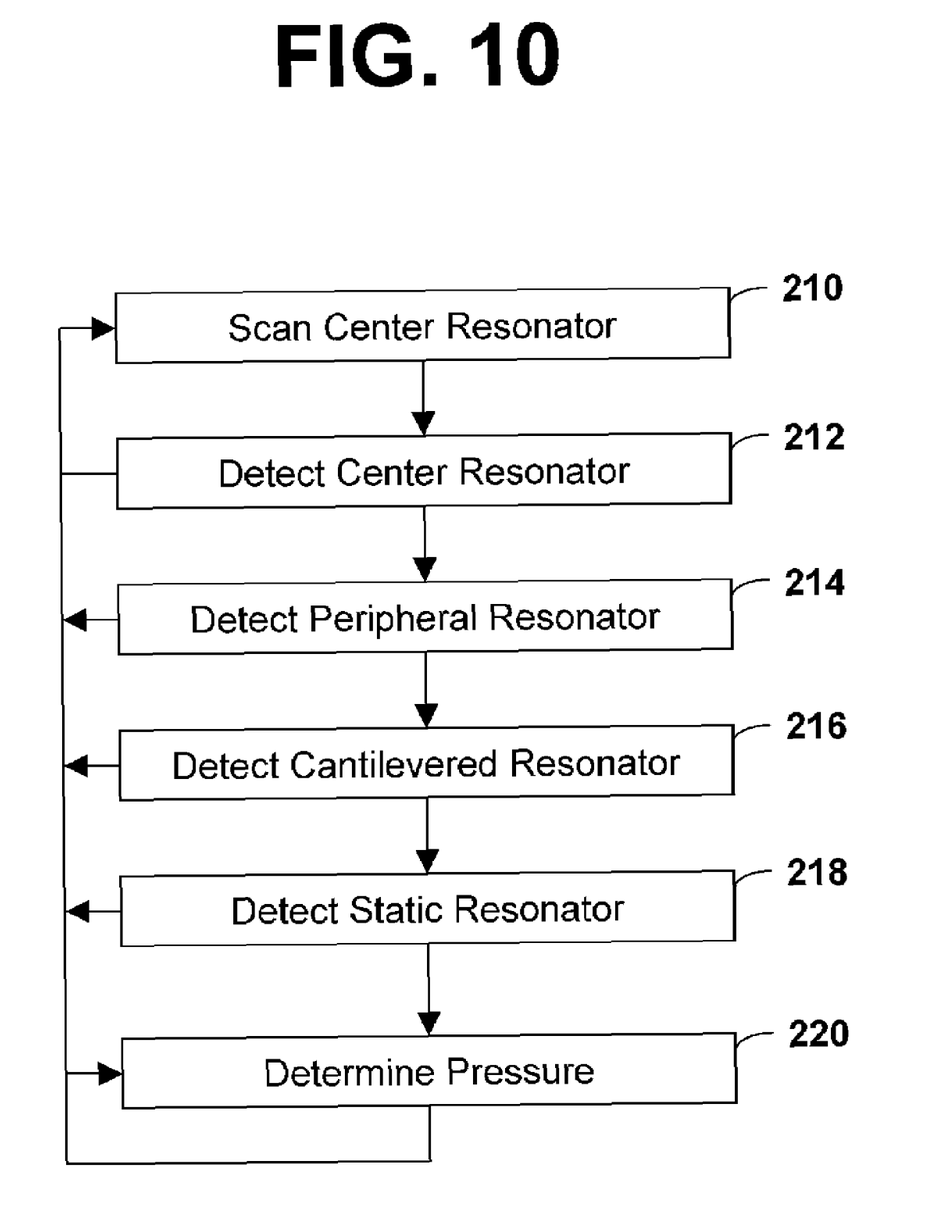
FIG. 10 is a flow diagram of another method for determining pressure, in accordance with another embodiment of the current invention.

FIG. 10 is a flow diagram of another method for determining pressure, in accordance with another embodiment of the present invention.

A center resonator on a deformable diaphragm of an optically coupled resonant pressure sensor is scanned, as seen at block 210. Using modulated incident light, a laterally offset photodiode adjacent to an optically coupled resonator is struck with the incident light and generates an electric field between the laterally offset photodiode and the resonator.

At least one resonant frequency of the center resonator is detected, as seen at block 212. Detection of the resonant frequency may use reflected light from a surface of the resonator. Pressure that is applied to the deformable diaphragm may be determined from the resonant frequencies of the center resonator, as seen at block 220.

To increase the accuracy and resolution of the pressure measurement, a resonant frequency of a peripheral resonator on or near the edge of the deformable diaphragm may be detected, as seen at block 214. The resonant frequency of the peripheral resonator shifts in an opposite direction of the center resonator as pressure is applied. Pressure may be determined from the resonant frequencies of the center and peripheral resonators, as seen at block 220. Pressure may be determined based on the peripheral resonator in lieu of or in conjunction with the center resonator.

A resonant frequency of a cantilevered resonator on the sensor die may be detected, as seen at block 216. The resonant frequency of the cantilevered resonator, attached to the sensor die at one attachment point, varies moderately with temperature and may be used to compensate the pressure determination for changes in temperature. Pressure may be determined with the cantilevered resonant frequency in conjunction with one or more resonators on the deformable diaphragm, as seen at block 220.

A resonant frequency of a static resonator on the sensor die may be detected, as seen at block 218. Pressure may be determined based on the static resonator in conjunction with the center resonator and optionally a lateral or edge resonator, as seen at block 220.

Pressure is determined, as seen at block 220. Using analytical techniques, mathematical modeling, look-up tables or other suitable approaches, resonant frequencies from one or more resonators are used to determine the pressure applied to the pressure sensor. Compensation may be made for temperature effects using output from the cantilevered resonator or other temperature-sensing device such as an RTD (resistive temperature device) or thermocouple. Multivariable output such as differential pressure, temperature, absolute pressure, barometric pressure, static pressure, or a combination thereof may be determined.

Other resonator designs and configurations include resonators attached to the substrate at one or both ends, cantilevered resonators, doubly supported resonators, cross resonators, butterfly resonators, crisscross resonators, single-ended and double-ended tuning fork resonators, single-ended and double-ended trident resonators, lobed resonators, circular resonators, oval resonators, ring resonators, beam resonators, balanced resonators, thin-beam resonators, cantilevered resonators with enlarged ends, tandem resonators, tandem resonators with enlarged ends, high-Q resonators, disk resonators, comb resonators, flexural resonators, torsional resonators, combination flexural/torsional resonators, lateral resonators, substrate resonators, bulk-mode resonators, surface-mode resonators, higher-mode resonators, resonators with one or more centered or offset holes, open-air resonators without a lid or shell, multiple resonators, resonator arrays, or combinations thereof. These resonators may be configured with or without a resonator shell. The resonator body may be exposed to atmospheric conditions, or placed in a suitable package that may be evacuated or filled with a controlled gas. The pressure sensor, for example, may be outfitted with a centered two-degree-of-freedom butterfly resonator or other suitable resonator that allows pressure and temperature determination with a single resonator.

The photodiode, although generally within or in close proximity to the resonator body, may be positioned farther away from the resonator and may be electrically connected to a suitable driving electrode that is proximate to the movable resonator body. Alternatively, a photodiode for exciting the resonator may be positioned in a portion of the upper surface of the resonator, in a sidewall of the resonator, in a sidewall of the structural layer adjacent to the resonator body, or in the shell, and the resonator may be driven with all or a component of the generated electric field when incident light strikes the photodiode.

In other embodiments, a thermally absorptive feature or material is selectively formed or placed on or near the resonator body to allow photothermal excitation of the resonator. Alternatively, the resonators, devices and processes can be adapted to form electrically coupled resonant devices, foregoing the need for optical connectivity. On-chip integrated circuitry or bondwire connections to external circuitry can be provided for generating and processing the output from the resonator.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are embraced herein.

What is claimed is:

1. An optically coupled resonant pressure sensor, comprising:

A deformable diaphragm; and

An optically coupled resonator fixedly attached to the deformable diaphragm, the resonator including a resonator body and a photodiode laterally offset from the resonator body, wherein the resonator is driven by an electric field generated between the photodiode and the resonator body when an incident light strikes the photodiode, and wherein pressure applied to one side of the deformable diaphragm causes a shift in the resonant frequency of the resonator.

2. The sensor of claim 1, wherein the deformable diaphragm comprises a portion of a semiconductor substrate.

3. The sensor of claim 2, wherein the semiconductor substrate is selected from the group consisting of a single-crystal silicon wafer and a silicon-on-insulator wafer.

4. The sensor of claim 1, wherein the resonator is centered on the deformable diaphragm.

5. The sensor of claim 1, wherein the resonator is sized based on an operating range of the sensor.

6. The sensor of claim 1, wherein a diaphragm thickness and a diaphragm size of the deformable diaphragm are selected based on an operating range of the sensor.

7. The sensor of claim 1 further comprising:
a resonator shell around the resonator body and the laterally offset photodiode that allows the resonator body to vibrate within a resonator cavity between the resonator shell and the resonator body.

8. The sensor of claim 1 further comprising:
a second resonator fixedly attached to the deformable diaphragm, wherein pressure applied to the one side of the deformable diaphragm causes a shift in a resonant frequency of the second resonator in a direction opposite that of the optically coupled resonator.

9. The sensor of claim 1 further comprising:
a second resonator fixedly attached at one attachment location to a sensor die having the deformable diaphragm, wherein a shift in a temperature of the sensor die causes a shift in a resonant frequency of the second resonator.

10. The sensor of claim 1 further comprising:
a second resonator fixedly attached to a sensor die having the deformable diaphragm, wherein a shift in static pressure applied to the sensor causes a shift in a resonant frequency of the second resonator.

11. The sensor of claim 1 further comprising:
a cap die including a fiber hole, the cap die and the fiber hole positioned over the resonator to allow detection of resonator vibrations via an optical fiber inserted through the fiber hole.

12. The sensor of claim 11 further comprising:
a spacer die including a spacer hole, the spacer die positioned between the cap die and a sensor die, the sensor die including the deformable diaphragm and the resonator.

13. The sensor of claim 1 further comprising:
an optical fiber optically coupled to the resonator.

14. The sensor of claim 13, wherein a sensor capsule including a cap die having a fiber hole and a sensor die having the deformable diaphragm is suspended by the optical fiber, wherein the optical fiber is inserted through the fiber hole.

15. The sensor of claim 1, wherein the deformable diaphragm and the optically coupled resonator are positioned in a pressure sensor housing, the pressure sensor housing having a barrier membrane.

16. The sensor of claim 15, wherein the pressure sensor housing includes a fluid between the barrier membrane and the deformable diaphragm.

17. A method of determining pressure, the method comprising:
Modulating an incident light;
Striking a photodiode laterally offset from a resonator body of a first resonator with the incident light;
Generating an electric field between the photodiode and the first resonator in response to the incident light, the first resonator fixedly attached to a deformable diaphragm;
Driving the resonator with a driving component of the generated electric field;
Detecting at least one resonant frequency of the first resonator; and
Determining an applied pressure applied to the deformable diaphragm based on the detected resonant frequency of the first resonator.

18. The method of claim 17 further comprising:
detecting a resonant frequency of a second resonator on a sensor die having the deformable diaphragm; and
determining the applied pressure based on the detected resonant frequency of the second resonator.

19. A system for determining pressure, the system comprising:
Means for modulating an incident light;
Means for striking a photodiode laterally offset from a resonator body of a first resonator with the incident light;
Means for generating an electric field between the photodiode and the first resonator in response to the incident light, the first resonator fixedly attached to a deformable diaphragm;
Means for driving the resonator with a driving component of the generated electric field;
Means for detecting at least one resonant frequency of the first resonator; and
Means for determining an applied pressure applied to the deformable diaphragm based on the detected resonant frequency of the first resonator.

20. The system of claim 19 further comprising:
means for detecting a resonant frequency of a second resonator on a sensor die having the deformable diaphragm; and
means for determining the applied pressure based on the detected resonant frequency of the second resonator.

* * * * *